(12) United States Patent  
Wardhan et al.

(10) Patent No.: US 11,822,537 B1
(45) Date of Patent: Nov. 21, 2023

(54) PROTOCOL BUFFER TRIE PACKING AND STREAMING UPDATES

(71) Applicant: o9 Solutions, Inc., Dallas, TX (US)

(72) Inventors: Siddarth Wardhan, Bangalore (IN); Smera George, Kerala (IN); Vikram Kulkarni, Bengaluru (IN)

(73) Assignee: o9 Solutions, Inc., Dallas, TX (US)

( * ) Notice: Subject to any disclaimer, the term of this patent is extended or adjusted under 35 U.S.C. 154(b) by 0 days.

(21) Appl. No.: 18/130,162

(22) Filed: Apr. 3, 2023

(51) Int. Cl.
  *G06F 16/23* (2019.01)
  *G06F 16/22* (2019.01)
  *G06F 16/28* (2019.01)

(52) U.S. Cl.
  CPC ........ *G06F 16/2365* (2019.01); *G06F 16/221* (2019.01); *G06F 16/282* (2019.01)

(58) Field of Classification Search
  CPC ... G06F 16/2365; G06F 16/221; G06F 16/282
  See application file for complete search history.

(56) References Cited

U.S. PATENT DOCUMENTS

| 11,481,361 B1* | 10/2022 | Dhoke | G06F 16/1844 |
| 2019/0236178 A1* | 8/2019 | Jagota | G06F 16/2246 |
| 2020/0004851 A1* | 1/2020 | Lambov | G06F 16/2255 |

\* cited by examiner

*Primary Examiner* — Robert W Beausoliel, Jr.
*Assistant Examiner* — Mohammad S Bhuyan
(74) *Attorney, Agent, or Firm* — Schwegman Lundberg & Woessner, P.A.

(57) ABSTRACT

Systems and techniques for protocol buffer trie packing and streaming updates are described herein. Data entities are identified in a received update query. An index value is assigned to each unique data entity to generate an index of unique data entities. A frequency of occurrence value is determined for each unique data. entity. The index of unique data entities is sorted by data entity type in descending order by the frequency of occurrence value of each unique data entity. A trie is generated with a root node assigned as a first unique data entity from the index of unique data entities that has a frequency of occurrence value with the largest numerical value. An update payload is created for the trie by conversion of the trie into a protocol buffer format through serialization of the trie into a binary string.

21 Claims, 6 Drawing Sheets

PROTOCOL BUFFER TRIE PACKING AND STREAMING UPDATES

TECHNICAL FIELD

Embodiments described herein generally relate to data structure update payload reduction and, in some embodiments, more specifically to protocol buffer trie packing and streaming updates.

BACKGROUND

A columnar database can include a large volume of data and may execute data definition language (DDL)/data manipulation language (DML). Data in the columnar database is updated and new data is inserted into the database over time. There can be a large volume of data updates and inserts in a large database. Each update and insert generates a large payload. The large update and insert payloads may overwhelm network resources. System administers may desire to reduce the size of the update and insert payloads to allow efficient transmission of the payloads using network resources.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An in-memory columnar database, referred to herein as a graph cube, can execute a data definition language (DDL)/data manipulation language (DML) commands using a proprietary structured query language (SQL)-like architecture called integrated business planning language (IBPL). When users perform a large number of updates/inserts, IBPL, being verbose, generates a large payload which is not practical to transfer over the network.

To overcome this issue, binary format was introduced, which encodes data in a serialized data structure (e.g., GOOGLE® protocol buffer) format to form a protobuf payload. This makes the payload much smaller compared to IBPL and hence is easy to transfer over the network, A protocol butler data. structure (or message) is a serialized binary wire format that is compact and lends itself to fast and efficient network transmission.

There are specific scenarios in this binary update which require further performance tuning, both in payload size and query processing time. The protocol buffer trie packing and streaming update solution described herein reduces the size of the update payload and increases update performance (e.g., update time reduction, reduced network utilization, etc.). As used herein, a trie is a tree data structure used to find keys in the graph cube.

The binary update in the graph cube has the capacity to update multiple fields at multiple intersections at the same time. This was implemented by processing one row of data from the protobuf payload at a time. This was the area which could be redesigned to make the processing faster. The solution consists of two parts: (1) identify the groups within the binary payload and place them together and (2) when the groups have been identified, enable processing them in one go, greatly increasing the performance.

Trie Packing

Trie packing of the payload forms the first part of the solution. This can be understood better using the following example. Suppose a user wants to update two records at a certain intersection. This can be represented as update queries shown below:

update Inventory@
(
　[Time]. [Week2],
　[Location]. Filter (#.Name in ([New York], [Dallas])),
　[Product]. [Brand X]
)=2000;
update Inventory@
(
　[Time].[Week2],
　[Location]. Filter (#.Name in ([New York], [Dallas]))
　[Product]. [Candy]
)=12000;
update Inventory@
(
　[Time]. [Week2],
　[Location]. Filter (#.Name in ([New York], [Dallas]))
　[Product]. [Razor]
)=1000;
update Price@
(
　[Time]. [Week2],
　[Product]. [Candy]
)=600;
update Price@
(
　[Time]. [Week2],
　[Product]. [Razor]
)=1600;

Here, "Inventory"/"Price" is a cell being updated with a value specified and various Dimension Members are coordinates that identify the specific cell. This roughly translates to the data as shown in Table 1. In an example, Table 1 is converted to a protobuf payload.

TABLE 1

| SI No | Measure | Coordinate1 | Coordinate2 | Coordinate3 | Value |
|---|---|---|---|---|---|
| 1 | Inventory | [Time].[Week2] | [Location].Filter(#.Name in ([New York], [Dallas])) | [Product].[Brand X] | 2000 |
| 2 | Inventory | [Time].[Week2] | [Location].Filter(#.Name in ([New York], [Dallas])) | [Product].[Candy] | 12000 |
| 3 | Inventory | [Time].[Week2] | [Location]. Filter(#.Name in ([New York], [Dallas])) | [Product].[Razor] | 1000 |
| 4 | Price | [Time].[Week2] | — | [Product].[Candy] | 600 |
| 5 | Price | [Time].[Week2] | — | [Product].[Razor] | 1600 |
| 6 | Inventory | [Time].[Week7] | — | — | 3000 |

As most of the rows will have repetitive members and measures, there is duplication of values in this payload. At the same time, there is a need to group data into buckets based on the measure being updated and attributes of the coordinates.

To achieve this, the above data is represented using a trie. Each node in the trie stores one coordinate. A traversal from root to any leaf will give all the coordinates (and hence one update query). Leaf nodes are special nodes that store the measure value in addition to the coordinate.

Figure 1:
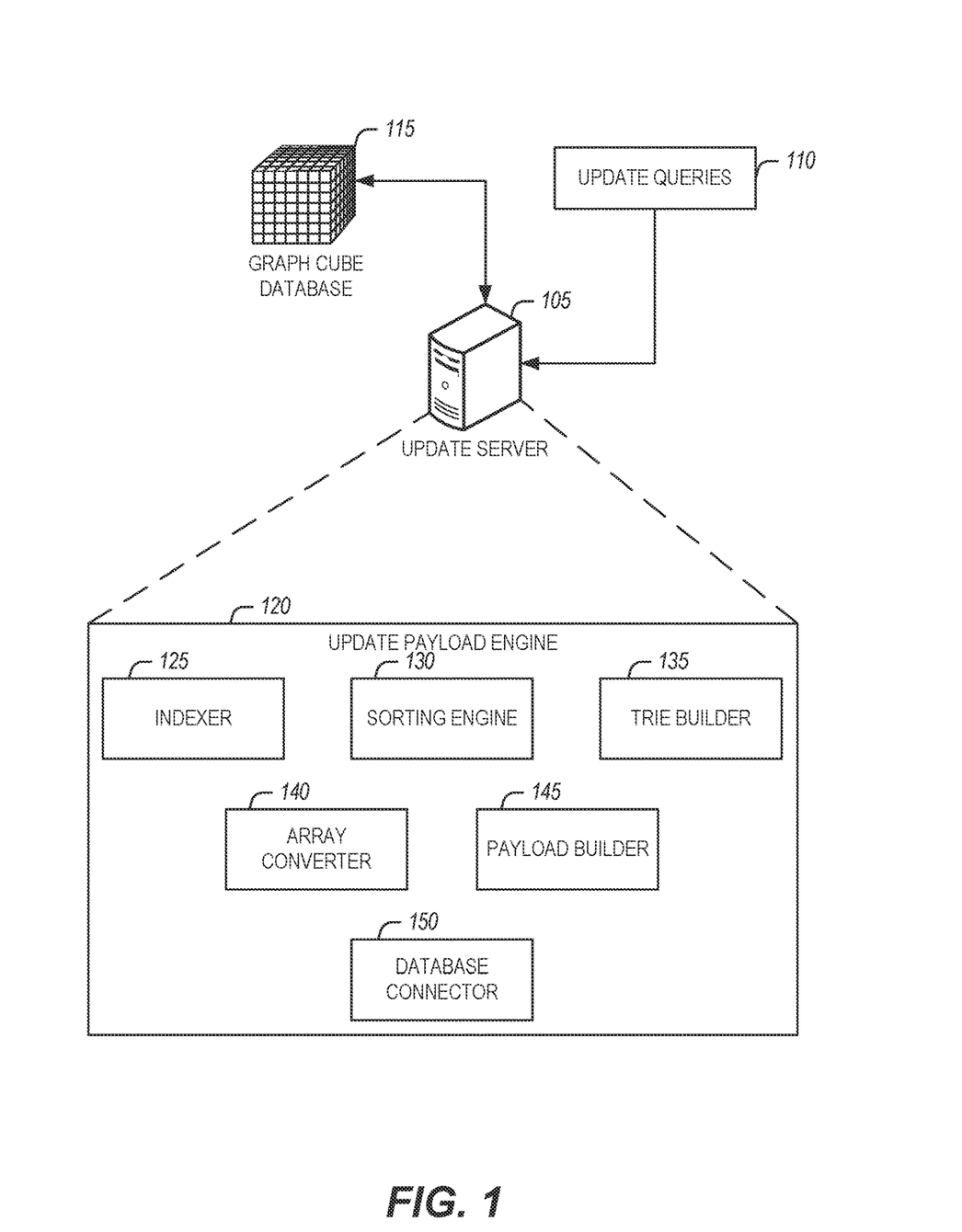
FIG. 1 is a block diagram of an example of an environment and a system for protocol buffer trie packing and streaming updates, according to an embodiment.

FIG. 1 is a block diagram of an example of an environment 100 and system 120 for protocol buffer trie packing and streaming updates, according to an embodiment. The example environment 100 includes an update server 105 that may receive update queries 110 to update data in a graph cube database/data structure 115. In the example environment 100, the update server includes the system 120. The update server 105 may be a standalone server, a cluster of servers, a cloud-based service, an application specific integrated circuit (ASIC), a field-programmable gate array (FPGA), or a combination of hardware and software instructions stored on a computer-readable medium and executable by at least one processor.

In an example, the system 120 is an update payload engine. The example system 120 includes a variety of components that may be implemented in computing hardware or in a combination of computing hardware and software instructions stored on a computer-readable medium and executable by at least one processor. The system 120 includes an indexer 125, a sorting engine 130, a trie builder 135, an array converter 140, a payload builder 145, and a database connector 150.

The indexer 125 receives the update queries 110 and generates a dictionary that includes each unique Dimension, Member, Measure, etc. in the list of incoming update queries. Each unique Dimension, Member, Measure, etc. is assigned a unique integer value (or an index) to generate an encoded dictionary (e.g., as shown in Table 2, etc.).

The sorting engine 130 identifies how many times each term in the dictionary occurs in the update queries. The sorting engine 130 arranges the terms by type in descending order of the number of occurrences for each term.

The trie builder 135 identifies the most frequent term and assigns the most frequent term as a root node of the trie. If there are multiple terms with equal occurrence counts, one term will be randomly selected as the root node. The trie builder 135 continues to build the tries by assigning additional child nodes based on descending occurrence. Leaf nodes are assigned to the bottom level of the tries for terms that do not have a reoccurrence value. The trie having nodes arranged by occurrence is stored in memory. An example set of tries is provided in FIG. 4.

Returning to the description of FIG. 1, the array converter 140 converts the trie to an array using post-order traversal.

The payload builder 145 serializes the array using protobuf format to generate an update payload. The update payload is transmitted to the graph cube database 115 via the database connector 150 to apply the updates to the graph cube database 115. Creating the trie simplifies the update queries by deduplicating coordinate information to reduce the size of the update queries. Serialization further reduces the size of the update payload and results in faster application of the update payload by the graph cube database 115.

Figure 2:
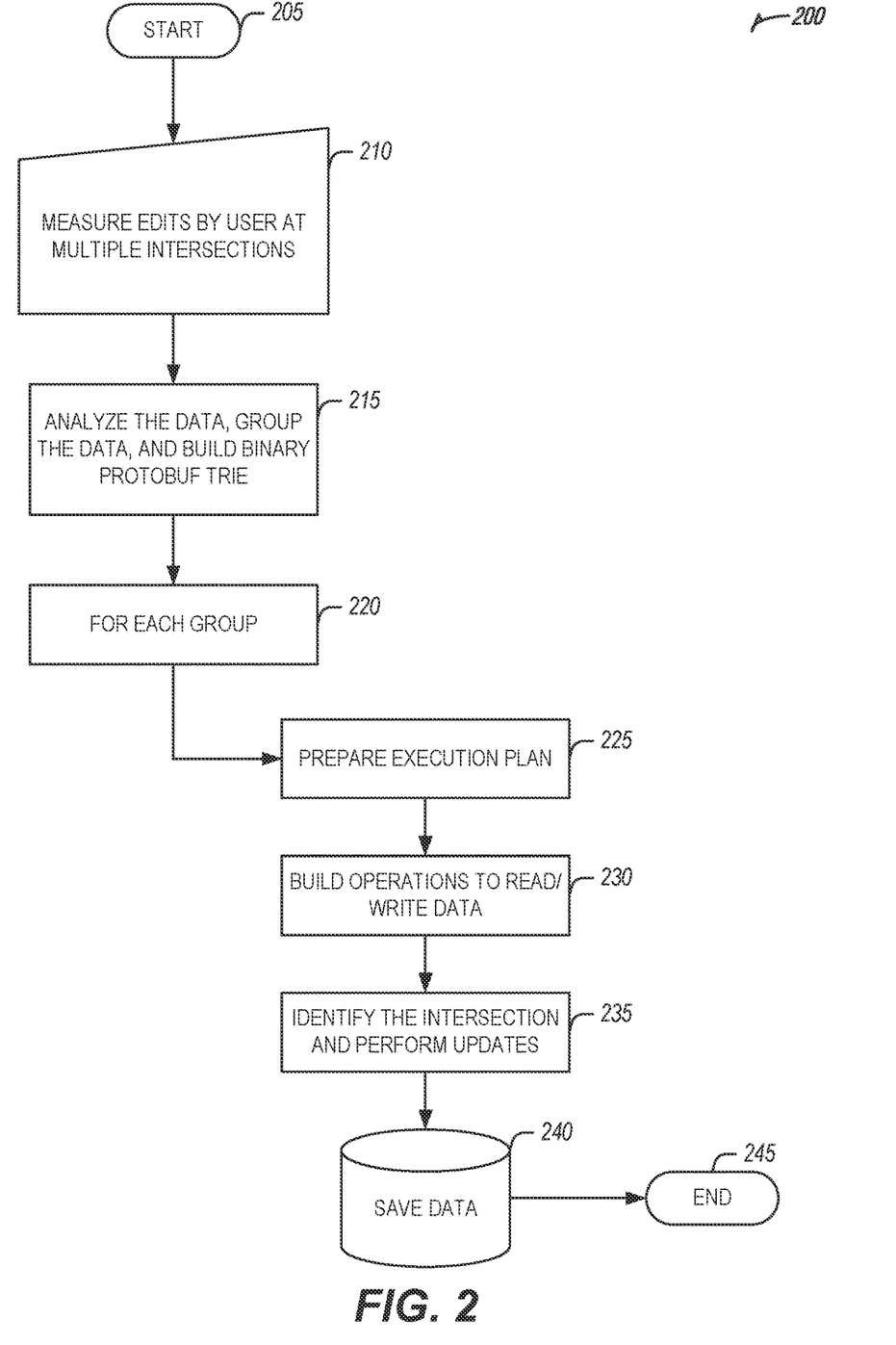
FIG. 2 illustrates a flow diagram of an example of a process for protocol buffer trie packing and streaming updates, according to an embodiment.

FIG. 2 illustrates a flow diagram of an example of a process 200 for protocol buffer trie packing and streaming updates, according to an embodiment. FIG. 2 may provide features as described in FIG. 1.

The process 200 begins at operation 205 with receipt of update queries. User edits are measured at multiple intersections of the graph cube (e.g., at operation 210. The data is analyzed and grouped resulting in generation of a binary protobuf trie (e.g., at operation 215). Each group is processed (e.g., at operation 220). A group (trie) is processed by preparing an execution plan (e.g., at operation 225), building operations to read/write data (e.g., at operation 230), and identifying an intersection and performing updates (e.g., at operation 235). The data (e.g., updated data) is saved (e.g., at operation 240). Groups are processed until there are no groups remaining for the update queries. The process 200 ends at operation 245.

Figure 3:
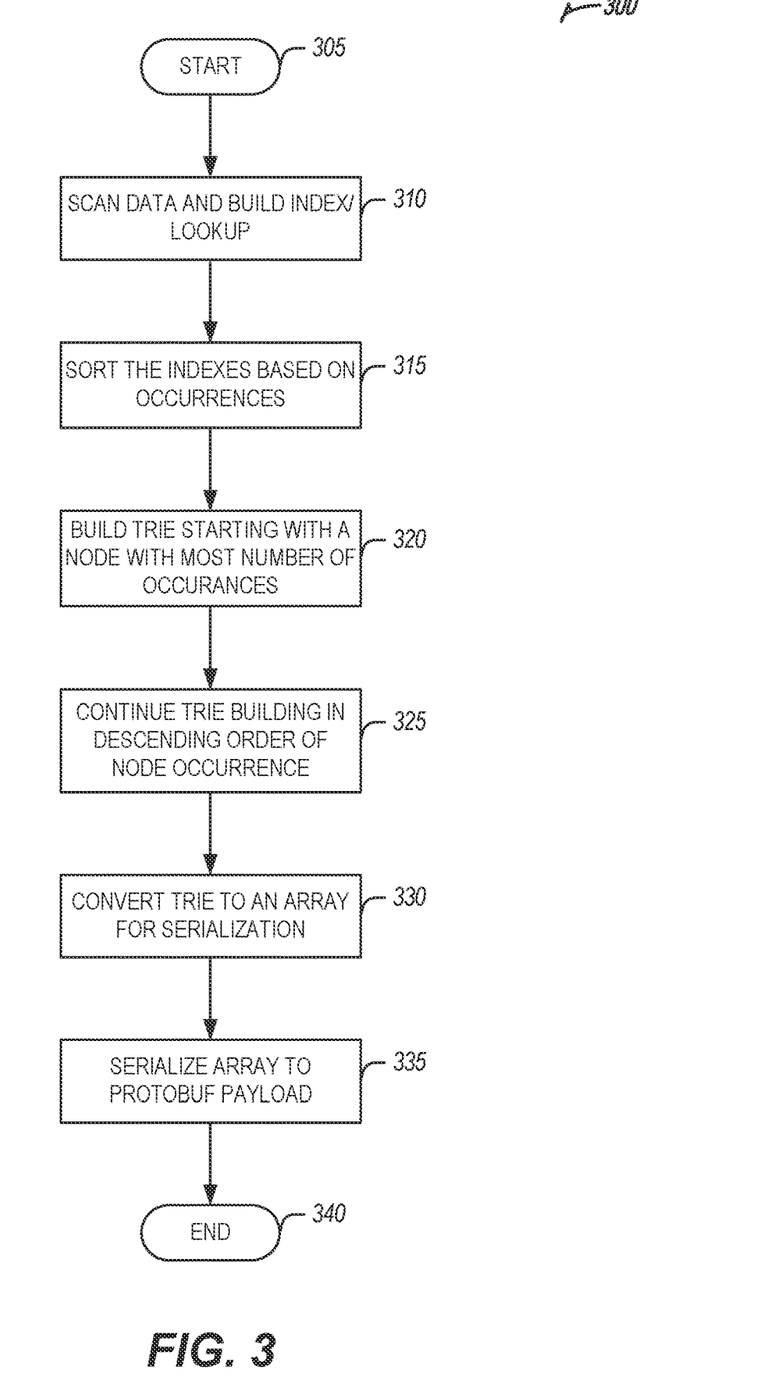
FIG. 3 illustrates a flow diagram of an example of a process for building a protobuf trie for protocol buffer trie packing and streaming updates, according to an embodiment.

FIG. 3 illustrates a flow diagram of an example of a process 300 for building a protobuf trie for protocol buffer trie packing and streaming updates, according to an embodiment. FIG. 3 may provide features as described in FIGS. 1 and 2.

The process begins at operation 305, Each unique Dimension, Member, Measure etc. on a list of incoming update queries is assigned a unique integer value (or an index) (e.g., at operation 310). This is dictionary encoding. Table 2 is an example dictionary encoding.

TABLE 2

| Name | Type | Index | No of Occurances |
|---|---|---|---|
| Inventory | Measure | 0 | 4 |
| Time | Dimension | 0 | 6 |
| Location | Dimension | 1 | 3 |
| Product | Dimension | 2 | 5 |
| Week2 | Member | 0 | 5 |
| New York | Member | 1 | 3 |
| Dallas | Member | 2 | 3 |
| Kellogs | Member | 3 | 1 |
| KitKat | Member | 4 | 2 |
| Gillette | Member | 5 | 2 |

Having built the dictionary to include a list of all the terms, the terms are sorted by type in descending order of the number of occurrences (e.g., at operation 315). This arranges the data as the most frequently occurring Dimension/Member to least frequently occurring Dimension/Member.

The most frequently occurring node is made the root and the trie is built (e.g., at operation 320). In case of multiple nodes with the same occurrence, one node is picked up at random.

Trie building continues with a next set of frequently occurring nodes, until the end of the list is reached at which point the measure name and its value that needs to be updated are stored (e.g. at operation 325).

There now exists an in-memory trie that is serialized for transport. To serialize the in-memory trie, the trie is converted to a list using post-order traversal (e.g., at operation 330).

The list (representing a trie) is further converted to protobuf format and becomes the payload to be sent to a server for processing (e.g., at operation 335). The process 300 ends at operation 340.

Figure 4:
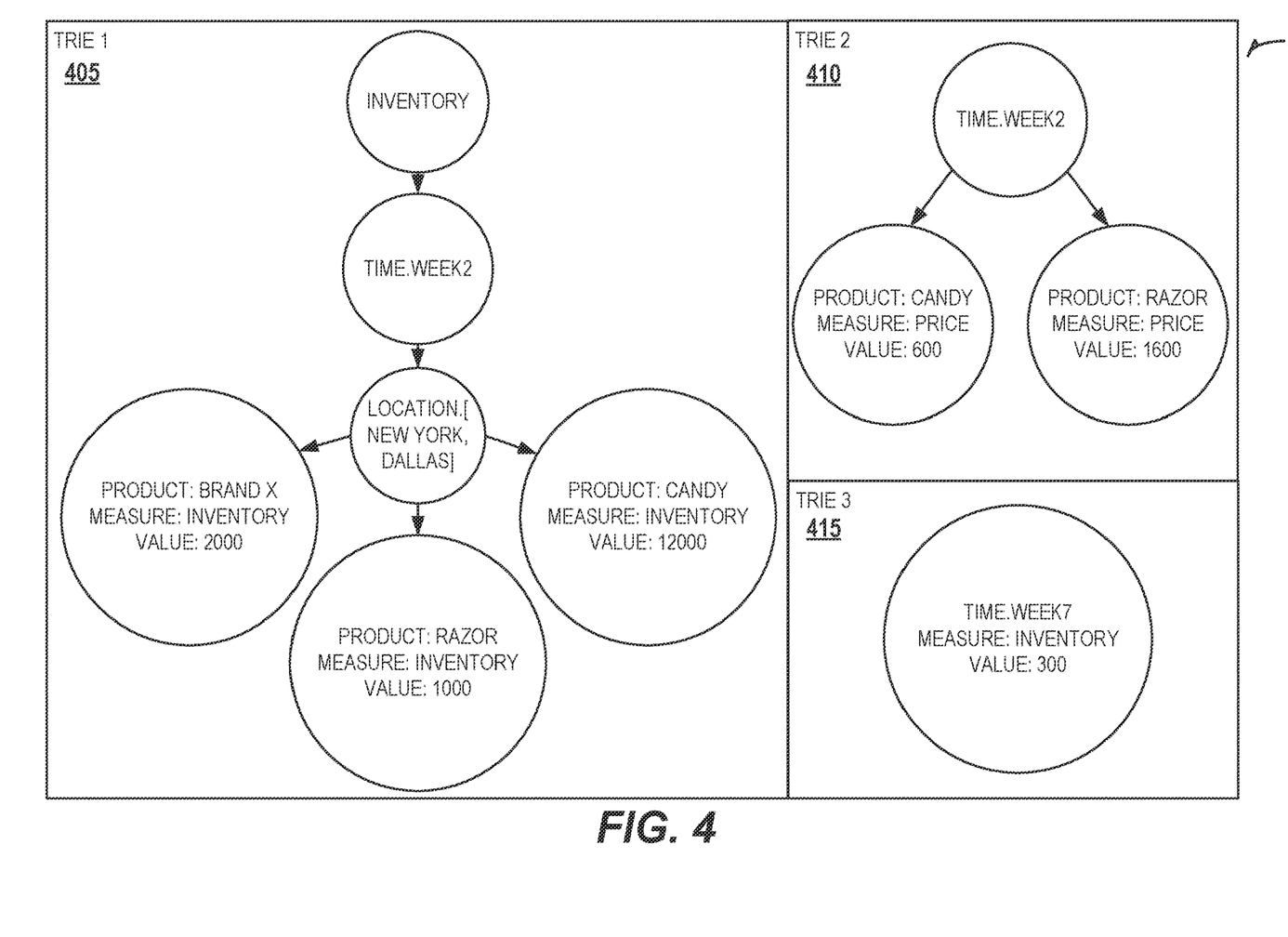
FIG. 4 illustrates an example of a tries for protocol buffer trie packing and streaming updates, according to an embodiment.

FIG. 4 illustrates an example of a tries 400 for protocol buffer trie packing and streaming updates, according to an embodiment. FIG. 4 may provide features as described in FIGS. 1 to 3. Post indexing processes, the same update rows table can be represented as a tries as shown in FIG. 4. The trie nodes consist of the index values (e.g., 1, 0, 2, etc.). For simplicity, the actual Dimension/Member/Measure names are shown in FIG. 4. In the example, three tries, trie 1 405, trie 2 410, and trie 3 415, are created based on received update queries.

As shown in FIG. 4, the coordinates that do not change between queries are stored only once. A traversal from a root to any leaf will give one complete update query. Using this format, space requirements are reduced by a factor of four to five on a large binary update. If a bulk update has different measures or a different set of coordinates, there will be additional tries (groups) created in the resultant payload.

Streaming Updates

While executing an update query in the graph cube, one obvious cost is in finding the correct intersection and creating/applying the new value there. Another, not so obvious, cost is in creating the execution plan and chain of operators needed to perform identification of intersection and value assignment, In an example, each of the records may be identified individually and a cell value may be updated. In order to identify a record, internal classes (e.g., execution plans, operators, etc.) are built. The cost of constructing each of these objects is not trivial. The grouping logic previously discussed enables a combination of a set of records to perform updates in a much more efficient manner.

The execution plan/operator is only instantiated once per group and the records from each group are streamed into the execution plan/operator to enable efficient updates of a cell value. Using an already instantiated operator results in a performance gain. The performance gain depends on several factors. One factor is the number of assignments in each group. As the number of assignments in a group increases, the performance gain also increases. In an instance with 20000 updates, a performance gain of around 50× can be achieved.

Figure 5:
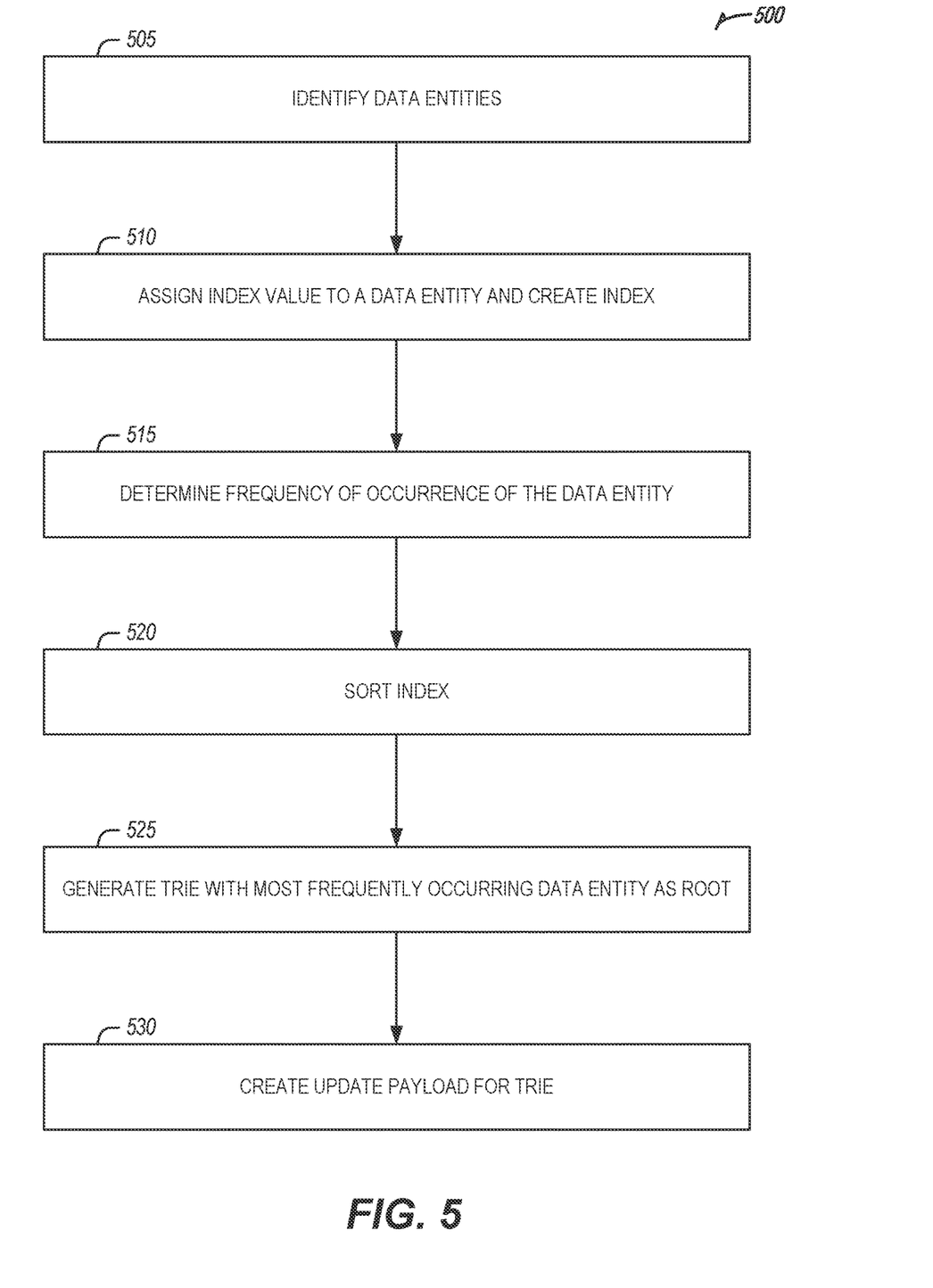
FIG. 5 illustrates an example of a method for protocol buffer trie packing and streaming updates, according to an embodiment.

FIG. 5 illustrates an example of a method 500 for protocol buffer trie packing and streaming updates, according to an embodiment. The method 500 may provide features as described in FIGS. 1 to 4.

Data entities are identified in a received update query (e.g., at operation 505). In an example, the received update query may be an update query to make a data update to a columnar database.

An index value is assigned to each unique data entity to generate an index of unique data entities (e.g., at operation 510). In an example, the index may be a dictionary encoding that includes a data entity name, a data entity type, the index value, and the frequency of occurrence value. In an example, the data entity type may be a measure, a dimension, or a member.

A frequency of occurrence value is determined for each unique data entity (e.g., at operation 515). The index of unique data entities is sorted by data entity type in descending order by the frequency of occurrence value of each unique data entity (e.g., at operation 520).

A trie is generated with a root node assigned as a first unique data entity from the index of unique data entities that has a. frequency of occurrence value with the largest numerical value (e.g., at operation 525). In an example, a child node may be added to the trie that corresponds to a second unique data entity from the index of unique data entities that has a frequency of occurrence value with the second largest numerical value. The child node may be in a hierarchical relationship with the root node.

An update payload is created for the trie by conversion of the trie into a protocol buffer format through serialization of the trie into a binary string (e.g., at operation 530). in an example, the update payload may be transmitted to a database server to process the update payload.

In an example, an execution operator may be identified for the update payload. additional update payloads may be identified that are compatible with the execution operator. The execution operator may be instantiated and the update payload and the additional update payloads may be executed using the instantiated execution operator.

Figure 6:
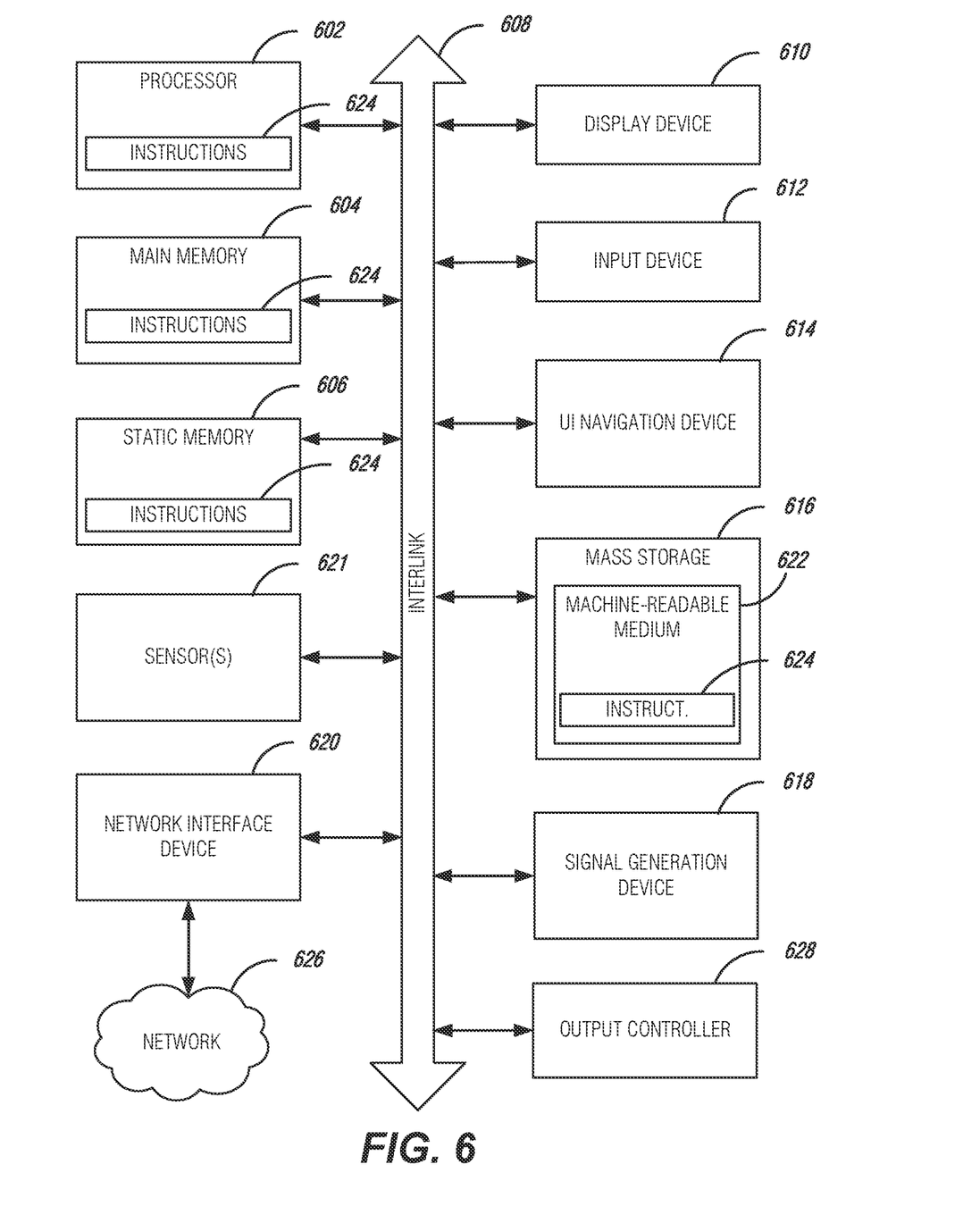
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment, The machine 600 may be a personal computer (PC), a tablet PC, a set-top box (STB), a personal digital assistant (MA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a. second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a. signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, Internet protocol (IP), transmission control protocol (TCP), user datagram protocol (LDP), hypertext transfer protocol (IITTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for protocol buffer trie packing and update streaming comprising:
   at least one processor; and
   memory including instructions that, when executed by the at least one processor, cause the at least one processor to perform operations to:
   identify data entities in a received update query;
   assign an index value to each unique data entity to generate an index of unique data entities;
   determine a frequency of occurrence value for each unique data entity;
   sort the index of unique data entities by data entity type in descending order by the frequency of occurrence value of each unique data entity;
   generate a trie with a root node assigned as a first unique data entity from the index of unique data entities that has a frequency of occurrence value with a largest numerical value; and
   create an update payload for the trie by conversion of the trie into a. protocol buffer format through serialization of the trie into a binary string.

2. The system of claim wherein the instructions to generate the trie further comprise instructions that, when executed by the at least one processor, cause the at least one processor to perform operations to:
   add a child node to the trie that corresponds to a second unique data entity from the index of unique data entities that has a frequency of occurrence value with a second largest numerical value, the child node in a hierarchical relationship with the root node.

3. The system of claim 1, wherein the received update query is an update query to make a data update to a columnar database.

4. The system of claim 1, the memory further comprising instructions that, when executed by the at least one processor, cause the at least one processor to perform operations to transmit the update payload to a database server to process the update payload.

5. The system of claim 1, wherein the index is a dictionary encoding that includes a data entity name, a data entity type, the index value, and the frequency of occurrence value.

6. The system of claim 5, wherein he data entity type is a measure, a dimension, or a member.

7. The system of claim 1, the memory further comprising instructions that, when executed by the at least one processor, cause the at least one processor to perform operations to:
   identify an execution operator for the update payload;
   identify additional update payloads that are compatible with the execution operator;
   instantiate the execution operator; and
   execute the update payload and the additional update payloads using the instantiated execution operator.

8. At least one non-transitory machine-readable medium including instructions for protocol buffer trie packing and update streaming that, when executed by at least one processor, cause the at least one processor to perform operations to:
   identify data entities in a received update query;
   assign an index value to each unique data entity to generate an index of unique data entities;
   determine a frequency of occurrence value for each unique data entity;
   sort the index of unique data entities by data entity type in descending order by the frequency of occurrence value of each unique data entity;
   generate a trie with a root node assigned as a first unique data entity from the index of unique data entities that has a frequency of occurrence value with a largest numerical value; and
   create an update payload for the trie by conversion of the trie into a protocol buffer format through serialization of the trie into a binary string.

9. The at least one non-transitory machine-readable medium of claim 8, wherein the instructions to generate the trie further comprise instructions that, when executed by the at least one processor, cause the at least one processor to perform operations to:
   add a child node to the trie that corresponds to a second unique data entity from the index of unique data entities that has a frequency of occurrence value with a second largest numerical value, the child node in a hierarchical relationship with the root node.

10. The at least one non-transitory machine-readable medium of claim 8, wherein the received update is an update query to make a data update to a columnar database.

11. The at least one non-transitory machine-readable medium of claim 8, further comprising instructions that, when executed by the at least one processor, cause the at least one processor to perform operations to transmit the update payload to a database server to process the update payload.

12. The at least one non-transitory machine-readable medium of claim 8, wherein the index is a dictionary encoding that includes a data entity name, a data entity type, the index value, and the frequency of occurrence value.

13. The at least one non-transitory machine-readable medium of claim 12, wherein the data. entity type is a measure, a dimension, or a member.

14. The at least one non-transitory machine-readable medium of claim 8, further comprising instructions that, when executed by the at least one processor, cause the at least one processor to perform operations to:
   identify an execution operator for the update payload;
   identify additional update payloads that are compatible with the execution operator;
   instantiate the execution operator; and
   execute the update payload and the additional update payloads using the instantiated execution operator.

15. A method for protocol buffer trie packing and update streaming comprising:
   identifying data entities in a received update query;
   assigning an index value to each unique data entity to generate an index of unique data entities;
   determining a frequency of occurrence value for each unique data entity;
   sorting the index of unique data entities by data entity type in descending order by the frequency of occurrence value of each unique data entity;
   generating a trie with a root node assigned as a first unique data entity from the index of unique data entities that has a frequency of occurrence value with a largest numerical value; and
   creating an update payload for the by converting the into a protocol buffer format by serializing the trie as a binary string.

16. The method of claim 15, wherein generating the trie further comprises:
   adding a child node to the that corresponds to a second unique data entity from the index of unique data entities that has a frequency of occurrence value with a second largest numerical value, the child node in a hierarchical relationship with the root node.

17. The method of claim 15, wherein the received update query is an update query to make a data update to a columnar database.

18. The method of claim 15, further comprising transmitting the update payload to a database server to process the update payload.

19. The method of claim 15, wherein the index is a dictionary encoding that includes a data entity name, a data entity type, the index value, and the frequency of occurrence value.

20. The method of claim 19, wherein the data entity type is a measure, a. dimension, or a member.

21. The method of claim 15, further comprising:
   identifying an execution operator for the update payload;
   identifying additional update payloads that are compatible with the execution operator;
   instantiating the execution operator; and
   executing the update payload and the additional update payloads using the instantiated execution operator.

\* \* \* \* \*